Nov. 22, 1949  C. Y. GARBER  2,488,859
ALIGNING MEANS FOR CONVEYER BELTS
Filed July 25, 1946  2 Sheets-Sheet 1

INVENTOR.
CLAUDE Y GARBER
BY
Smith & Wells
ATTYS.

Nov. 22, 1949 — C. Y. GARBER — 2,488,859

ALIGNING MEANS FOR CONVEYER BELTS

Filed July 25, 1946 — 2 Sheets-Sheet 2

INVENTOR.
CLAUDE Y. GARBER
BY
Smith & Wells
ATTYS.

Patented Nov. 22, 1949

2,488,859

UNITED STATES PATENT OFFICE 2,488,859

ALIGNING MEANS FOR CONVEYER BELTS

Claude Y. Garber, Kellogg, Idaho

Application July 25, 1946, Serial No. 686,175

2 Claims. (Cl. 198—202)

1

The present invention relates to aligning means for conveyor belts and has for its purpose the provision of a novel idler construction whereby the belt can be caused to drift toward center position of the support rollers without wearing the edge of the belt unduly.

Conveyor belts are used to convey a variety of materials, some of which are quite heavy and quite difficult to load evenly on the belt. This is particularly true where the conveyor belts are used for supporting such materials as ore and crushed aggregates of various materials. It is almost impossible to load a belt with such material so that the load will be exactly centered on the belt. When the material on the belt is not centered, the uneven loading causes the belt to tend to climb to one side or the other of the supporting rollers. This necessitates frequent adjustments and more or less constant attention of the workmen to keep the belt in line. At present the supporting rollers for the conveyor belt which are located at frequent intervals along the course of the belt, are sometimes mounted on a frame that is pivoted at the center of the roller assembly, the rollers being provided with some means whereby the added friction of the belt will turn the roller frame on its pivot and tend to make the belt climb to the other side. One practice has been to secure to the frame secondary vertical rollers which the belt engages when it starts to ride up on the high side of the supporting rollers. These secondary rollers depend on friction entirely to pull the pivoted supporting roller frame around to a position to cause the belt to climb the opposite or high side. The wear on the edges of the belt permits water and foreign material to enter into the fabric of the belt and deteriorate it more rapidly than would usually be the case.

My invention contemplates the provision of a pivoted supporting roller assembly with means whereby vertical rollers at the sides of the belt will at the instant they are contacted by the belt effect a change in the transverse position of the supporting rollers to correct the riding of the belt toward that side of the supporting rollers. The corrective movement is accomplished by the amount of rotation imparted to the vertical rollers. The vertical rollers are made cone shaped in order to engage the belt with the maximum efficiency and are connected by suitable driving means including a lever on the roller frame to correct the position of the supporting rollers with a minimum amount of wear on the edge of the belt.

2

The novel features that I consider characteristic of my invention are set forth with particularity in the claims. The invention itself, however, both as to its organization and its method of operation, together with additional objects and advantages thereof, will be understood from the description of a specific embodiment when read in connection with the accompanying drawings, in which:

Figure 3 is a sectional view taken on the line 3—3 of Figure 1.

Figure 1:
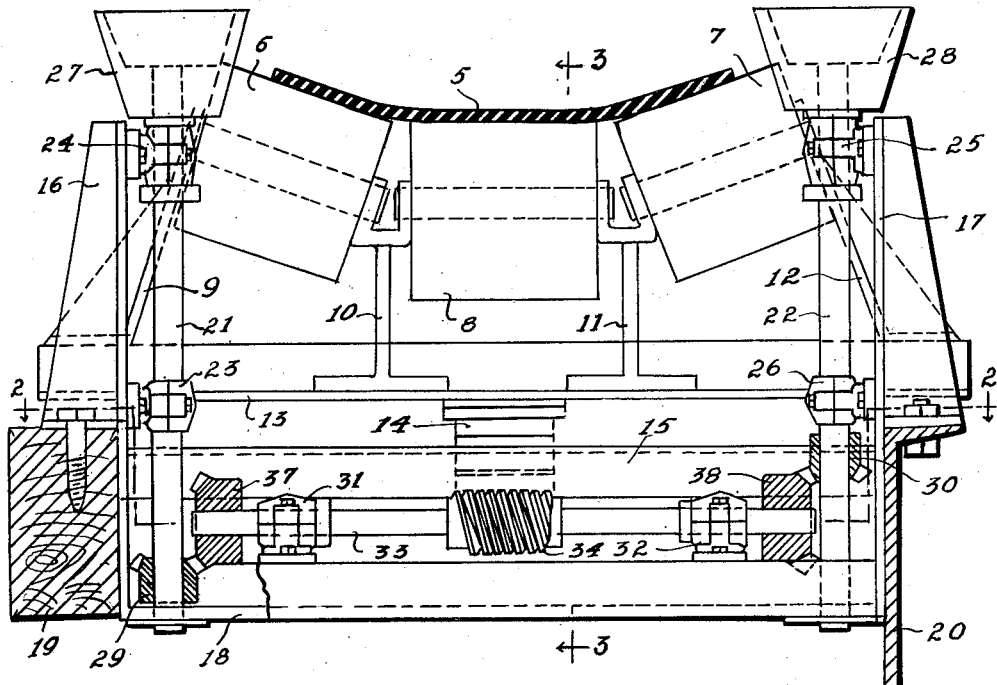
Figure 1 is a cross sectional view through a conveyor illustrating supporting rollers and my improved corrective device as they appear in the conveyor support mechanism.

Referring now to the drawings, my invention is shown in connection with a conveyor system wherein the conveyor belt is indicated by the numeral 5 and a set of idler rollers is shown supporting the belt. These rollers comprise a roller 6 and a roller 7 which are tilted to the horizontal and an intermediate roller 8. The three rollers tend to guide the belt 5 and keep it in the trough-like shape shown in Figure 1. According to my invention, this particular set of idler rollers is adapted to be inserted at intervals along the length of the conveyor belt with other sets, not including my invention being interposed between sets embodying my invention because it is not necessary to have all of the supporting rollers for the belt adjustable to take care of uneven loading of the belt. The rollers 6, 7 and 8 are supported by four standards 9, 10, 11 and 12, which standards are carried by a cross beam 13. The beam 13 has a pivot post 14 at its center which pivotally supports the beam 13 from a cross beam 15 that is part of the main conveyor frame. It is not new to pivotally support the idler roller frame and to provide means on the pivoted frame by which the idler rollers will be turned on the pivot to correct drift of the belt to one side or the other. My invention comprises a novel means for effecting the turning movement of the frame 13 and the rollers supported thereby so that the belt itself can be more readily returned to proper position on the supporting rollers and a great deal of the wear and abrasion of the side edges of the belt can be avoided.

In carrying out my invention, I mount a separate frame work consisting of two uprights 16 and 17 and a cross beam 18 upon the main conveyor frame, the side pieces of which are shown at 19 and 20 in Figure 1. On each of the uprights 16 and 17 I mount a shaft such as 21 or 22. These shafts are supported by suitable bearings 23, 24, 25 and 26, which bearings are mounted on the uprights 16 and 17. Each shaft at its upper end carries a cone-shaped roller, the roller on the the shaft 21 being indicated by the numeral 27 while the roller on the shaft 22 is indicated by the numeral 28. These rollers are tapered so that their surfaces facing the belt will be substantially at right angles thereto. Thus the belt, when it rides against one of the rollers, will meet it squarely and will not wedge or pinch against the roller. A gear 29 is mounted on the lower end of the shaft 21, and a gear 30 is mounted on the shaft 22 just below the bearing 26. The cross beam 18 has two bearings 31 and 32 mounted thereon. These bearings support a shaft 33 which has a worm gear 34 at the mid point thereof. Bevelled gears 37 and 38 are provided at the opposite ends of the shaft 33 for engagement with the gears 29 and 30 respectively. The worm gear 34 meshes with a gear segment 35 that is formed on a lever arm 36. The lever arm 36 is secured to the lower end of the post 14.

Figure 2:
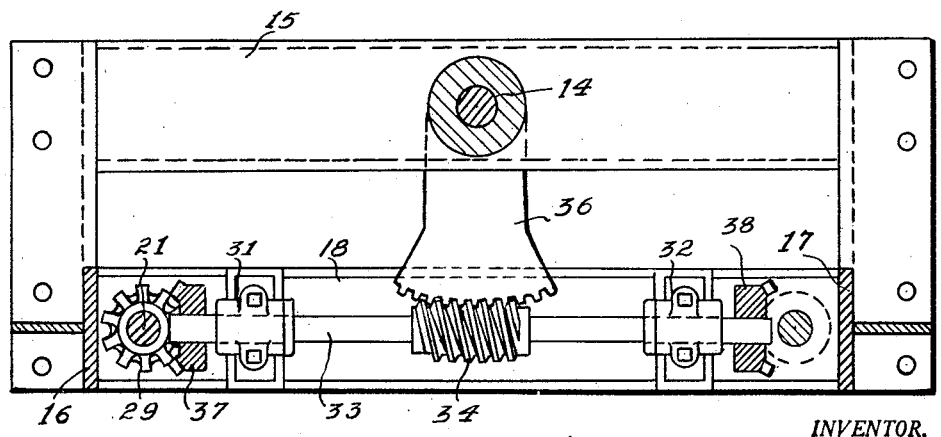
Figure 2 is a plan sectional view taken substantially on the line 2—2 of Figure 1.
Figure 2:
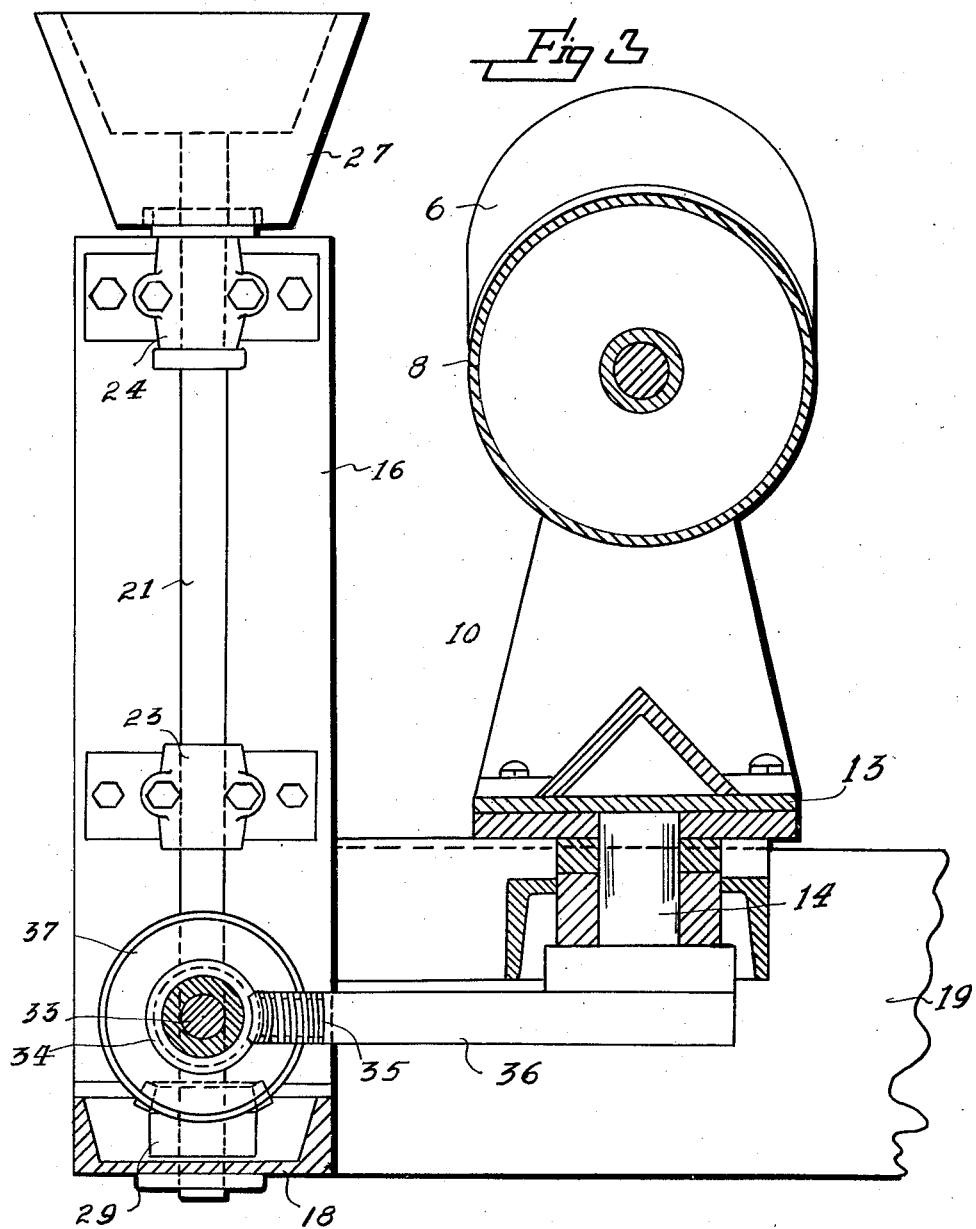

The operation of the device to correct belt drive due to the uneven loading of the belt 5 is as follows. Assuming that the load or any other condition on the belt 5 is such as to cause it to move toward the roller 27 until it strikes this roller; the immediate result of the belt striking the roller 27, if the belt is traveling toward the observer as shown in Figure 1, will be to rotate the shaft 21 and through it the gears 29 and 37 and the shaft 33 to cause the worm gear 34 to turn the lever arm 36 to the right as shown in Figure 2. This will move the idler roller support 13 in a direction to advance the roller 7 against the belt. This will cause the belt to climb the roller 7 since the roller 7 being advanced along the belt will be a high point toward which the loaded belt tends to climb. The gear ratio afforded by the worm 34 and the gear segment 35 is such that very little force is required from the belt to effect the corrective action necessary. The corrective action is made quickly because it is dependent upon the speed of the travel of the belt 5. The frame work which carries the corrective mechanism is separate and apart from the support of the idler rollers, the only connection between them being through the worm gear and the lever arm 36. The rollers 27 and 28 are thus always the same distance apart and do not become wedged against the belt if the corrective tendency is too great. It will be noted that the supporting base 13 of the idler rollers is long enough, however, to be stopped against the uprights 16 and 17 in the event that the corrective movement is carried too far because of extremely bad loading conditions on the belt 5.

My invention as shown and previously described has proven quite successful in taking care of uneven loading on conveyor belts carrying ore and the like. The side edges of the belt have shown very little wear due to their engagement with the rollers 27 and 28. Since the uneven loading is seldom continuous on the same side of the belt, the belt works across the idler rollers from one side to the other and correction will be applied only when the belt engages one of the rollers 27 or 28. This correction will be maintained only so long as is necessary and when the belt drifts to the other side and strikes the opposite roller, correction in the opposite direction results.

It is immaterial with this device whether the conveyor belt 5 travels in one direction of the other. In other words, if the travel of the belt 5 is away from the observer in Figure 1 and the belt rides up to strike the roller 27, the roller 27 will be rotated in such direction as to cause the gears, 29 and 37 and the worm 34 and gear 35 to move the lever arm 36 to the left as shown in Figure 2 thus moving the roller 7 toward the observer and making it the high point toward which the belt 5 will climb. The device may be applied to the return or lower, unloaded, flight of the conveyor belt as well as to the loaded flight.

It is believed that the nature and advantages of my invention will be clear from the foregoing description and the accompanying drawings.

Having thus described my invention, I claim:

1. Means for correcting side drift of conveyor belts due to uneven loading and the like, said means comprising a supporting idler roller unit on which the belt is carried, a frame on which the unit is pivoted to turn about a vertical axis, uprights on the frame at opposite sides of the belt and adjacent to the supporting idler roller unit, upright shafts carried by said uprights, rollers fixed on the upper ends of said shafts at the level of the side edges of the belt, and means driven by said shafts operable by engagement of the belt with either roller and rotation of its shaft, to turn the supporting idler roller unit on its pivot and move the end thereof adjacent to the shaft that is rotated in the direction of travel of the belt, said driven means comprising a horizontal shaft geared to both said vertical shafts, a worm thereon and a gear segment carried by the idler roller unit, meshing with the worm.

2. Means for correcting the side drift of conveyor belts comprising a main frame having side frame members and a cross beam, an idler roller cross beam above the first named cross beam and having its ends extending over the side frame members, said last named cross beam being pivotally supported on the first cross beam, a lever arm fixed to and extending at right angles to the second named cross beam, belt supporting idler rollers on said second named cross beam, the lever arm having a gear segment at its free end, a pair of uprights fixed to the main frame at the opposite sides thereof adjacent to the first named cross beam in position for engagement by the ends of the second cross beam to limit its pivotal movement, upright shafts carried by said uprights, rollers fixed on the upper ends of the shafts at the level of the side edges of a belt on said idler rollers, a horizontal shaft adjacent to the lower ends of said shafts and having a worm thereon meshing with the gear segment, and cooperating gears on the upright shafts and the horizontal shaft operable to rotate the horizontal shaft from either upright shaft.

C. Y. GARBER.

REFERENCES CITED

The following references are of record in the file of this patent:

UNITED STATES PATENTS

| Number | Name | Date |
| --- | --- | --- |
| 1,510,051 | Forbes | Sept. 30, 1924 |
| 1,770,957 | Veale | July 22, 1930 |
| 1,963,099 | Robins | June 19, 1934 |
| 2,109,956 | Corbin | Mar. 1, 1938 |